United States Patent
Tse et al.

(10) Patent No.: US 8,727,642 B1
(45) Date of Patent: May 20, 2014

(54) QUICK-RELEASE CAMERA MOUNTING SYSTEM

(71) Applicants: Wilson Tse, Burnaby (CA); Craig Hansen, Burnaby (CA)

(72) Inventors: Wilson Tse, Burnaby (CA); Craig Hansen, Burnaby (CA)

(*) Notice: Subject to any disclaimer, the term of this patent is extended or adjusted under 35 U.S.C. 154(b) by 0 days.

(21) Appl. No.: 13/794,553

(22) Filed: Mar. 11, 2013

(51) Int. Cl.
*G03B 17/56* (2006.01)
*F16M 11/04* (2006.01)

(52) U.S. Cl.
CPC .......... *G03B 17/561* (2013.01); *F16M 11/041* (2013.01); *A45F 2200/0533* (2013.01)
USPC .......................................... 396/419; 396/423

(58) Field of Classification Search
CPC .............. G03B 17/561; F16M 11/041; A45F 2200/0533
USPC .................................. 396/419, 423
See application file for complete search history.

(56) References Cited

U.S. PATENT DOCUMENTS

| | | |
|---|---|---|
| 3,356,325 A | 12/1967 | Schnase |
| 3,612,462 A * | 10/1971 | Mooney et al. ............ 248/316.4 |
| 4,057,816 A | 11/1977 | Killian, Jr. et al. |
| 4,125,211 A | 11/1978 | Handsman |
| 4,419,794 A | 12/1983 | Horton, Jr. et al. |
| 4,525,052 A | 6/1985 | Kosugi et al. |
| 4,570,887 A | 2/1986 | Banister |
| 4,929,973 A | 5/1990 | Nakatani |
| 5,014,892 A | 5/1991 | Copeland |
| 5,201,858 A | 4/1993 | Otrusina |
| 5,222,826 A * | 6/1993 | Hanke ............................ 403/381 |
| 5,230,490 A | 7/1993 | Sloop |
| 5,251,800 A | 10/1993 | Leenders |
| 5,375,749 A | 12/1994 | Oliva |
| 6,042,277 A | 3/2000 | Errington |
| 6,196,504 B1 * | 3/2001 | Lemke ........................ 248/187.1 |
| 6,234,690 B1 * | 5/2001 | Lemieux ....................... 396/419 |
| 6,371,424 B1 * | 4/2002 | Shaw ........................ 248/222.12 |
| 6,435,738 B1 * | 8/2002 | Vogt ............................... 396/419 |
| 6,546,637 B2 * | 4/2003 | Fischer .......................... 33/290 |
| 6,827,319 B2 * | 12/2004 | Mayr ......................... 248/187.1 |
| 7,185,862 B1 * | 3/2007 | Yang .......................... 248/187.1 |
| 7,980,771 B2 | 7/2011 | Chamberlayne |
| 2008/0131106 A1 | 6/2008 | Bruce |
| 2011/0007207 A1 | 1/2011 | Corticelli |
| 2011/0205426 A1 * | 8/2011 | Kang ............................ 348/373 |

FOREIGN PATENT DOCUMENTS

| | | |
|---|---|---|
| EP | 1 441 169 A2 | 7/2004 |
| KR | 10-2010-0048282 | 5/2010 |
| WO | WO 2009/109828 A1 | 9/2009 |
| WO | WO 2011/156004 A2 | 12/2011 |

* cited by examiner

*Primary Examiner* — W B Perkey
(74) *Attorney, Agent, or Firm* — Cameron IP

(57) ABSTRACT

There is provided a quick-release camera mounting system for connecting a camera to an object, such as tripod, backpack strap or belt. The camera has a base. The system includes an adapter with a base that is connectable to the object. The adapter has a protrusion that operatively connects to and extends outwards from its base. The system includes a camera mount threadably connecting to the base of the camera and for connecting with the adapter. The camera mount has a locking mechanism capable of quickly releasing the adapter from the camera mount. The locking mechanism includes a centrally disposed recessed portion. The protrusion of the adapter is shaped to fit within the recessed portion and engage with the locking mechanism for selectively connecting the adapter to the camera mount.

21 Claims, 15 Drawing Sheets

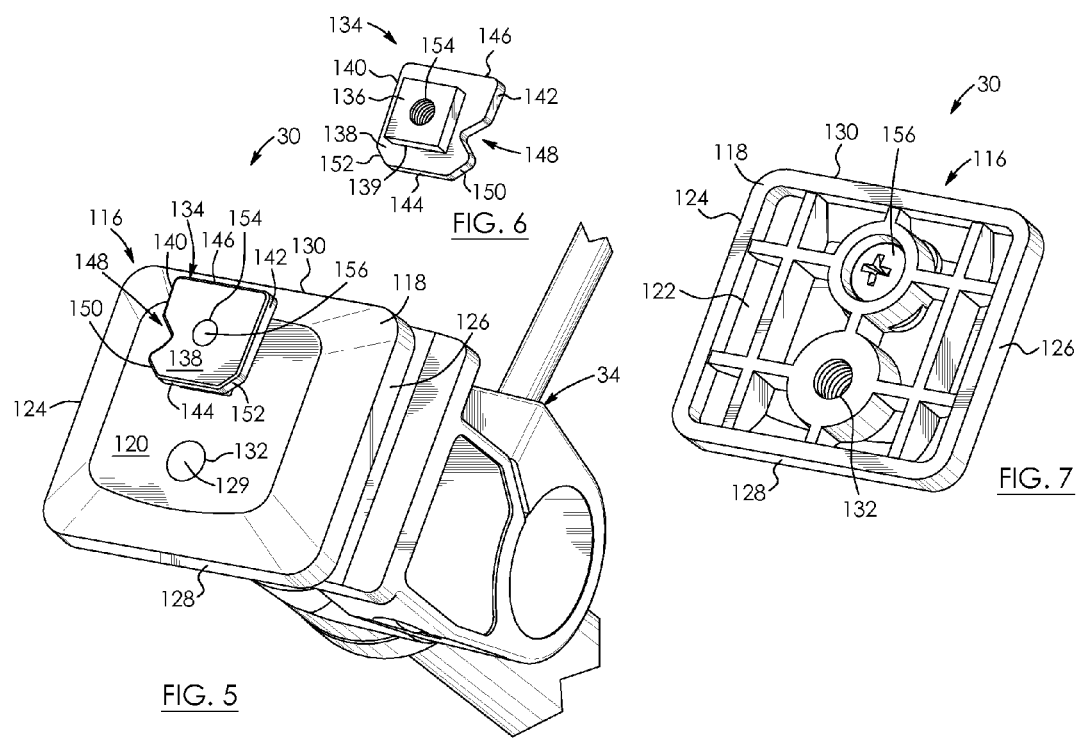

QUICK-RELEASE CAMERA MOUNTING SYSTEM

FIELD OF THE INVENTION

There is provided a mounting system. In particular, there is provided a quick-release camera mounting system.

DESCRIPTION OF THE RELATED ART

It is known per se to provide a camera with a camera mount comprising a protrusion or shoe for selectively connecting to a desired object, such as a tripod or a belt.

For example, U.S. Pat. No. 5,014,892 to Copeland discloses a camera carrying device for connecting a camera 21 to a belt 22. The device includes an angle plate 26 which connects to the base of a camera 21, as seen in FIG. 2. The angle plate has a slot engaging stud 52. The camera carrying device includes a support plate 25 connectable to the belt 22. The support plate has a slot means within which stud 52 engages for selectively connecting the camera to the belt. However, such a system may not readily enable the camera to connect to a tripod mount.

A separate attachment member, such as attachment member 12 shown in U.S. Pat. No. 3,356,325 to Schnase, is required to connect stud 52 of plate 26 to a tripod. However, the system shown in Schnase may not readily enable the camera to connect to a belt.

United States Patent Publication No. 2011/0007207 A1 to Corticelli and International Patent Publication No. WO 2011/156004 to Dering provide systems that include plates that connect to the base of the camera and assemblies that connect to a belt or strap. Each of the assemblies connecting to the belt or strap includes a seat for connecting with the plate, an elongate member aligning with the lens of the camera and a fastening means 8. Such systems may be relatively bulky and/or may not be connectable to a tripod, for example.

There is accordingly a need for a more universal camera mounting system that overcomes the above disadvantages.

BRIEF SUMMARY OF INVENTION

There is provided an improved quick-release camera mounting system disclosed herein that overcomes one or more of the above disadvantages.

There is accordingly provided a quick-release camera mounting system for connecting a camera to an object. The camera has a base. The system includes an adapter with a base that is connectable to the object. The adapter has a protrusion that operatively connects to and extends outwards from its base. The system includes a camera mount threadably connecting to the base of the camera and for connecting with the adapter. The camera mount has a locking mechanism capable of quickly releasing the adapter from the camera mount. The locking mechanism includes a centrally disposed recessed portion. The protrusion of the adapter is shaped to fit within the recessed portion and engage with the locking mechanism for selectively connecting the adapter to the camera mount.

There is also provided a quick-release camera mounting system for mounting a camera to one of a plurality of objects, including a tripod, a backpack strap or a belt. The system has a camera mount that includes a means for connecting to the camera. The system has a pair of adapters each having substantially similar protrusions. The camera mount has a quick-release locking means for selectively connecting to the protrusion of either of the respective ones of the adapters to the camera mount. A first one of the adapters has a means for connecting to the tripod. A second one of the adapters has a means for connecting to at least one of the backpack strap or the belt. Alternatively, the adapters could be adapted to connect with other objects, including handlebar mounts for bikes, for example, and car dashboard mounts, for example.

There is further provided a quick-release camera mounting system for connecting a camera to one of a plurality of objects, including a tripod, a backpack strap or a belt. The camera has a base. The system includes a camera mount threadably connecting to the base of the camera. The camera mount has a locking mechanism which includes a u-shaped recessed portion. The system includes a pair of adapters. Each of the adapters has a base and a substantially similar protrusion. Each protrusion operatively connects to and extends outwards from the base of its respective adapter. The protrusions are shaped to fit within the u-shaped recessed portion and engage with the locking mechanism for selectively connecting respective ones of the adapters to the camera mount. The locking mechanism is capable quickly releasing from respective ones of the adapters. A first one of the adapters has a means for connecting to the tripod. A second one of the adapters has an elongate aperture shaped for the backpack strap or the belt to extend therethrough.

BRIEF DESCRIPTION OF DRAWINGS

The invention will be more readily understood from the following description of preferred embodiments thereof given, by way of example only, with reference to the accompanying drawings, in which:

FIG. 5 is a top, side perspective view of a further part of the camera mounting system, in particular a tripod mount adapter, together with a tripod connected thereto, the tripod mount adapter having a protrusion;

FIG. 6 is a bottom perspective view of the protrusion of the tripod mount adapter of FIG. 5;

FIG. 7 is a bottom perspective view of the tripod mount adapter of FIG. 5;

DESCRIPTION OF THE PREFERRED EMBODIMENTS

Figure 1:
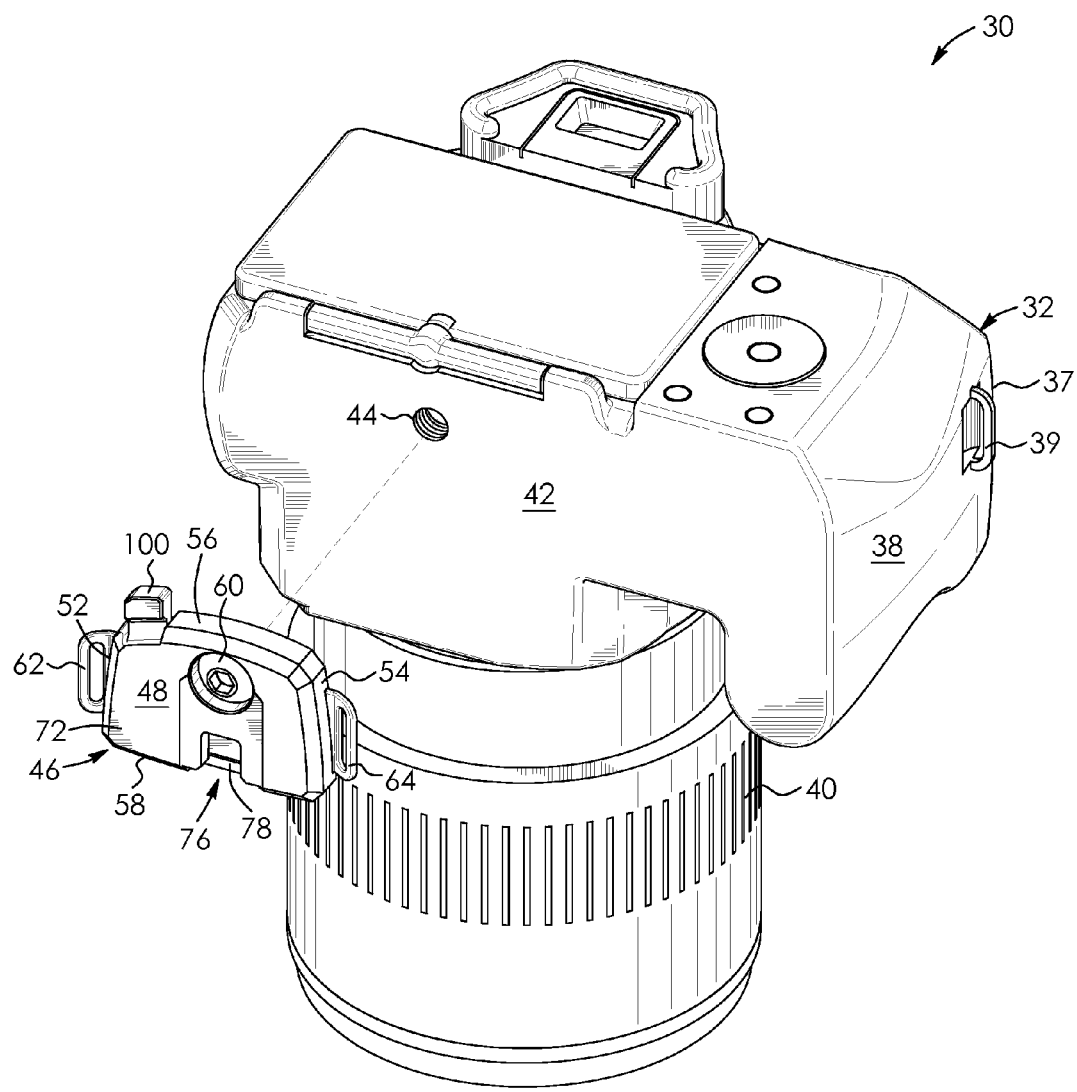
FIG. 1 is an exploded, rear, bottom perspective view of a camera together with part of a camera mounting system, in particular a camera mount.
Figure 16:
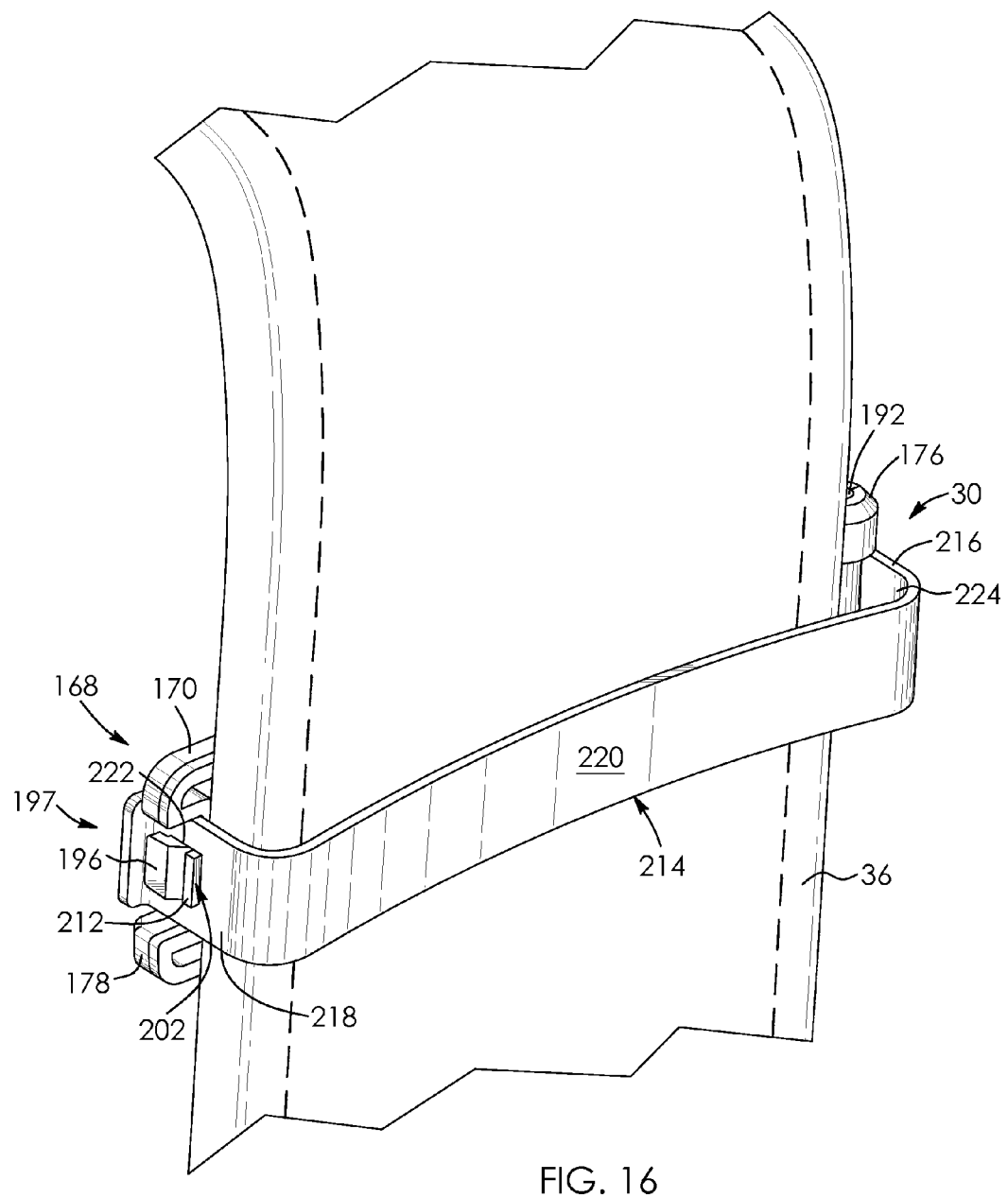
FIG. 16 is a rear perspective view of the strap mount adapter of FIG. 15, the elongate arm being shown in a closed position, together with a strap positioned between the base and elongate arm of the adapter.

Referring to the drawings and first to FIG. 1, there is shown a quick-release camera mounting system 30 for connecting a camera 32 to an object, such as a tripod 34 shown in FIG. 5, or a backpack strap or a belt, for example, as generally shown by strap 36 in FIG. 16. Referring back to FIG. 1, the camera is conventional and has a body 37 with a side 38. The camera 32 includes a strap connector 39 on its side, a lens 40 connected to the body, a base 42 and a threaded aperture 44 extending through the base. Aperture 44 is typically used for connecting camera 32 to a tripod.

Figure 2:
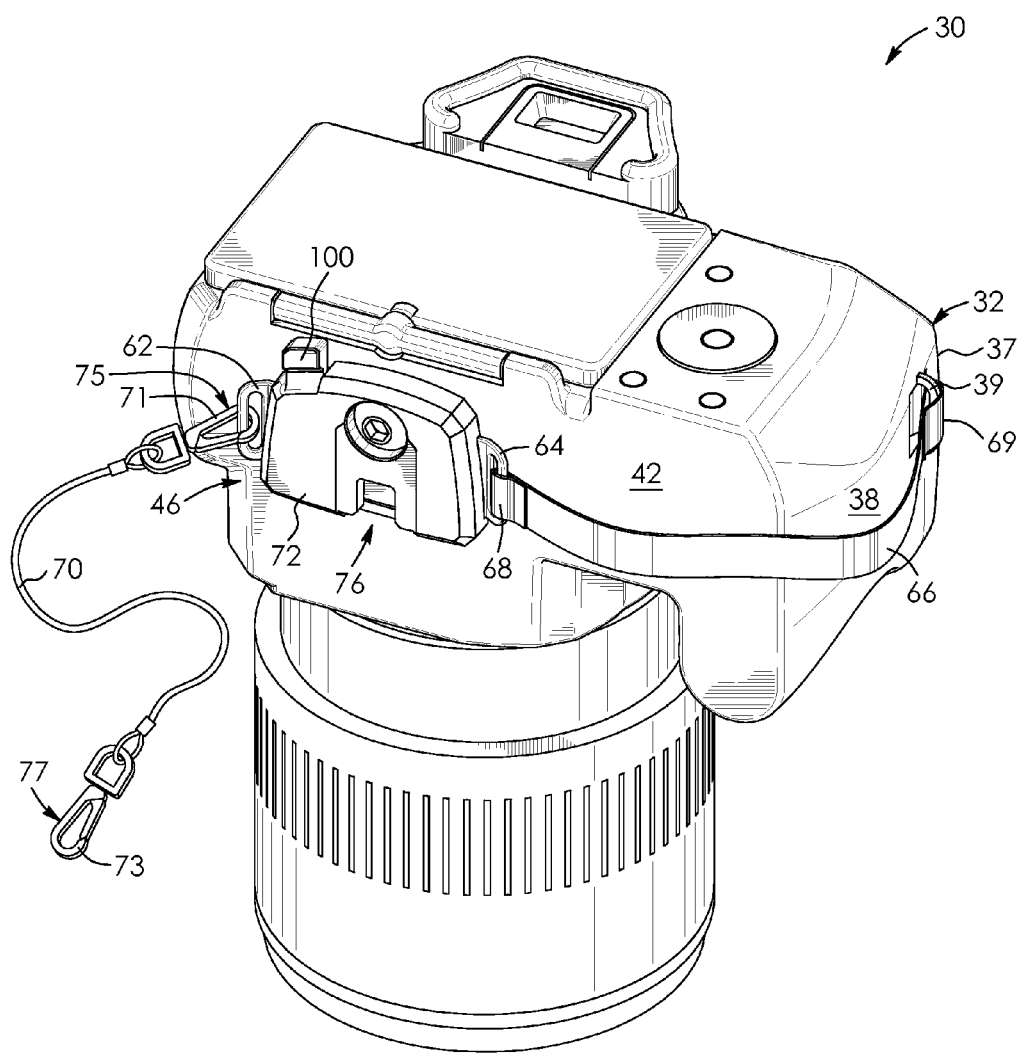
FIG. 2 is a rear, bottom perspective view of the camera and camera mount of FIG. 1.
Figure 3:
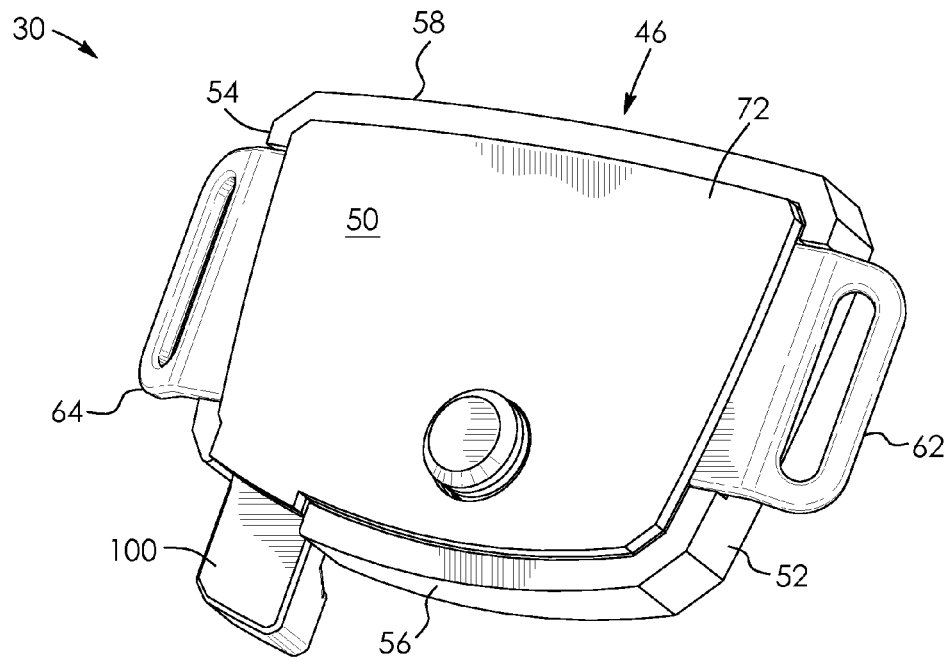
FIG. 3 is a top perspective view of the camera mount of FIG. 2, including the top of the mount.
Figure 4:
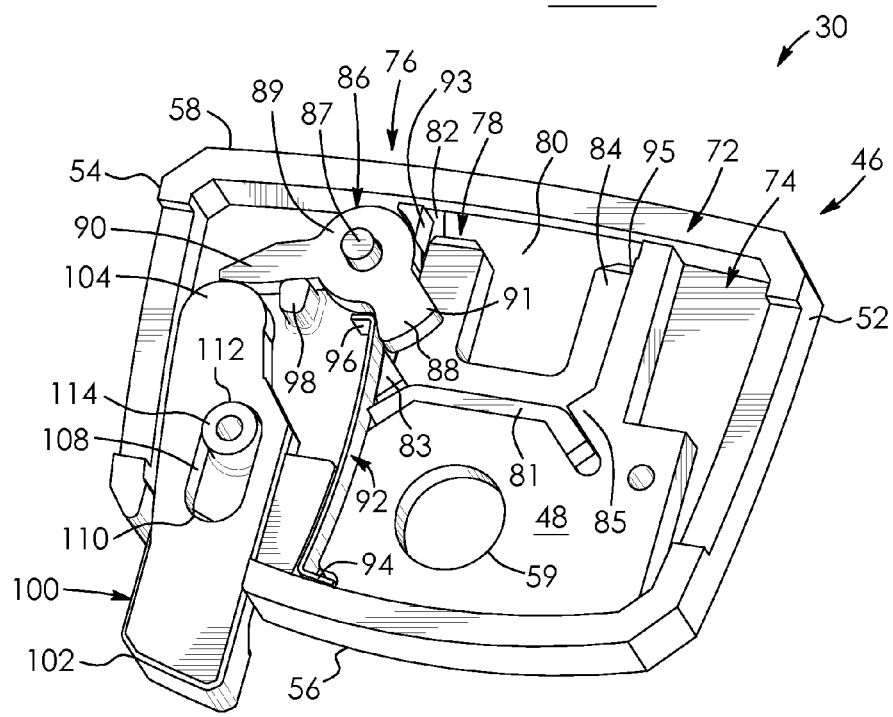
FIG. 4 is a top perspective view of the camera mount of FIG. 3, with the top of the mount removed and its interior being shown, the camera mount having a locking mechanism and a latch shown in a locking mode.
Figure 8:
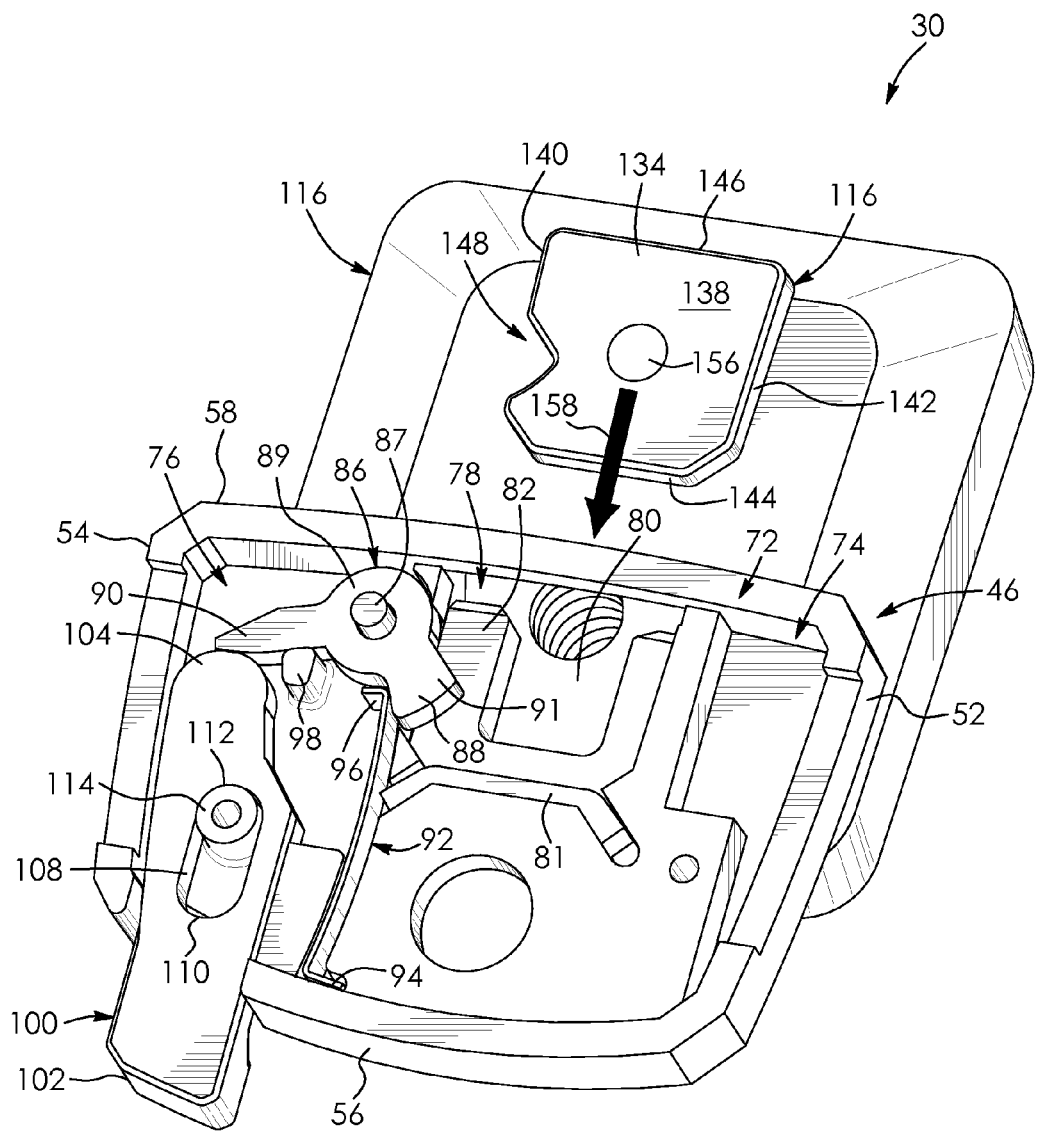
FIG. 8 is a top perspective view of the camera mount of FIG. 4, the camera mount having a u-shaped recessed portion, together with a top, side perspective view of the tripod mount adapter with its protrusion moving towards the u-shaped recessed portion.

The quick-release camera mounting system 30 includes a camera mount 46 for threadably connecting to the base 42 of the camera 32. The camera mount is generally in the shape of a rectangular plate in this example. The camera mount 46 is connected to and extends in parallel with the base of the camera as seen in FIG. 2. Referring back to FIG. 1, the camera mount has a bottom 48 facing outwards from the base 42 of the camera, a top 49, seen in FIG. 3, which is opposite the bottom, and a pair of spaced-apart sides 52 and 54, the top 49 extending between the sides. A rubber cover 50 substantially extends across top 49 of the camera mount and is shaped to abut the base 42 of the camera 32 as seen in FIG. 2. The camera mount 46 includes a pair of spaced-apart ends 56 and 58 that are generally perpendicular to the sides 52 and 54. Bottom 48 and top 49 extend between ends 56 and 58. As seen in FIGS. 3 and 4, the camera mount 46 includes an aperture 59 that extends through its bottom and top and which is positioned between sides 52 and 54 of the camera mount.

As seen in FIG. 1, the camera mount is threadably connected to the base 42 of the camera 32 via a threaded connector, in this example a screw 60 shaped to extend through aperture 59 shown in FIG. 4 and threadably connect with aperture 44 of the camera. The screw extends through the bottom and top of the camera mount in this example. The screw 60 is disposed between sides 52 and 54 and is adjacent to end 56 of the camera mount 46. The screw may be referred to as a means for connecting to the camera for the camera mount.

The camera mount 46 includes a pair of spaced-apart strap connectors 62 and 64. The strap connectors are loop-shaped in this example. Connector 62 connects to and extends outwards from side 52 of the camera mount 46 and connector 64 connects to and extends outwards from side 54 of the camera mount.

As seen in FIG. 2, the system 30 includes a hand strap 66 in this example. The hand strap has a first end 68 and a second end 69 which is spaced-apart from the first end. The first end 68 of the hand strap connects to strap connector 64 of the camera mount 46. The second end 69 of the hand strap connects to the strap connector 39 of the camera 32. A user may grip side 38 of the camera 32 with his or her hand (not shown) positioned between side 38 and the strap 66. The strap so configured functions to promote retention of the camera should the camera slip out of the user's hand, thereby inhibiting the camera from dropping to the ground and getting damaged.

The system 30 includes a safety tether 70 in this example, as seen in FIG. 2. The safety tether has a first end 71, a second end 73 spaced-apart from the first end, and a pair of hook members, in this example snap hooks 75 and 77 located at ends 71 and 73, respectively. Snap hook 75 may selectively connect to strap connector 62 of the camera mount 46. Snap hook 77 may attach to the user of the camera 32. In this manner, should the camera slip out of the user's hand, the safety tether 70, so connected to the camera mount and user, further functions to inhibit the camera from dropping to the ground and getting damaged. Hand strap 66 and safety tether 70 may individually or collectively be referred to as safety straps.

The camera mount 46 includes a housing 72. The housing extends between bottom 48 of the camera mount, top 49 of the camera mount seen in FIG. 3, sides 52 and 54 of the camera mount, and ends 56 and 58 of the camera mount. The camera mount 46 has an interior 74 as shown in FIGS. 4 and 8 to 11. Housing 72 substantially encloses the interior of the camera mount. The top 49 of the camera mount 46 is shown removed in FIGS. 4 and 8 to 11 for the sake of illustration to reveal the interior parts and functionings of the camera mount.

The camera mount includes a quick-release locking mechanism 76. The quick-release locking mechanism is substantially disposed within the housing 72 of the camera mount 46. The locking mechanism includes a centrally disposed u-shaped recessed portion 78. The u-shaped recessed portion extends inwards from end 58 and bottom 48 of the camera mount 46. The u-shaped recessed portion 78 is positioned between sides 52 and 54 of the camera mount in this example. As seen in FIG. 4, the u-shaped recessed portion includes a first slot 80 and a second slot 82 that is larger than slot 80. The slots are generally rectangular in this example. The u-shaped recessed portion 78 includes a u-shaped plate 84 that extends around and forms slot 80. As seen in FIG. 4, the u-shaped recessed portion includes a pair of beveled, v-shaped ends 83 and 85 spaced-apart from end 58 of the camera mount. The quick-release locking mechanism 76 includes a dampener 81, in this example a made of rubber, which extends between ends 83 and 85. The specific configuration of the dampener is not strictly required and may vary in other embodiments. Spaced-apart inner walls 93 and 95 of the mount 46, ends 83 and 85, and dampener 81 surround and form slot 82.

The quick-release locking mechanism includes a latch 86 disposed within the housing 72 of the camera mount 46. The latch pivotally connects to the camera mount via pivot pin 87 located adjacent to slot 82 and end 58 of the camera mount. Latch 86 has a first end 88, a central round portion 89, in this example and a second end 90 which is spaced-apart from the first end 88. Pivot pin 87 is coaxial with the round portion 89 in this example and is positioned between ends 88 and 90. The ends 88 and 90 extend radially outwards from the pivot pin. The first end 88 of the latch 86 is generally rectangular in shape. The latch has a wedge-shaped portion 91 that is part of the first end of the latch. The second end 90 of the latch 86 is elongate and tapered in this example.

The quick-release locking mechanism 76 includes an elongated spring 92 having a first end 94 abutting the housing 72 and a second end 96 spaced-apart from the first end. The second end 96 of the spring is positioned to abut first end 88 of the latch 86. The spring 92 biases the latch into a spring-biased locking mode shown in FIGS. 4, 8 and 10 in which the wedge-shaped portion 91 of the latch extends within the u-shaped recessed portion 78 of the camera mount 46, in this example extending within slot 82. The camera mount 46 includes a knob 98 positioned within its interior 74 and upon which second end 90 of the latch 86 abuts when the latch is in the locking mode. The latch has a release mode shown in FIG. 11 in which the first end 88 of the latch, in particular the wedge-shaped portion 91, is positioned substantially free of the u-shaped recessed portion 78 of the camera mount 46, in this example being positioned substantially free of slot 82.

Figure 9:
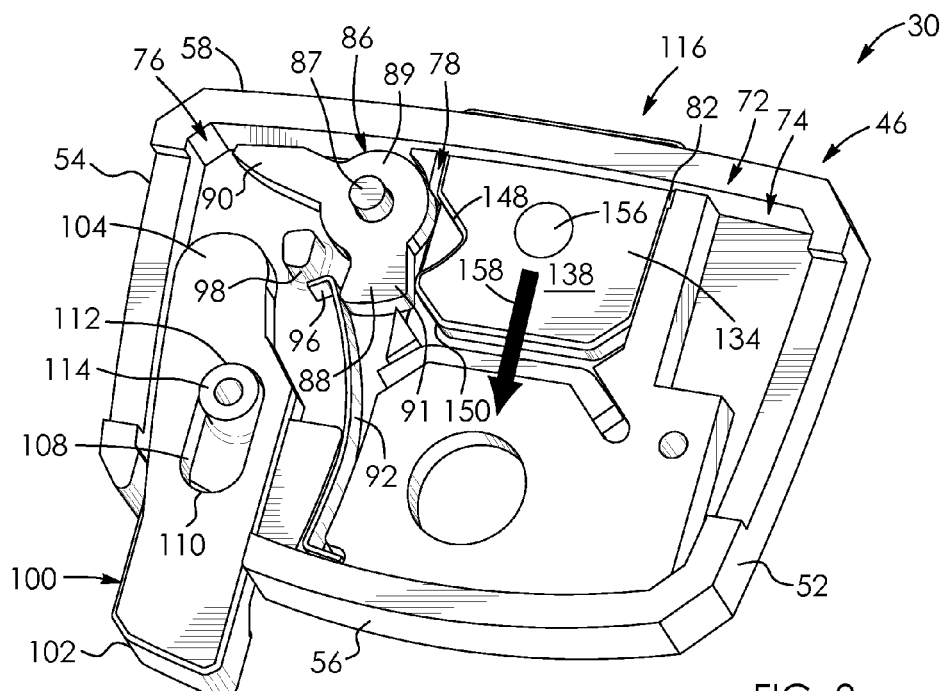
FIG. 9 is a top perspective view of the camera mount of FIG. 8, together with a top, side perspective view of the protrusion of the tripod mount adapter, the rest of the tripod mount adapter being hidden.

The quick-release locking mechanism 76 includes a release button 100. The release button is elongate and is substantially positioned within the interior 74 of housing 72. The release button 100 has a first end 102 for pushing with a user's finger and a second end 104 which is rounded in this example and which is spaced-apart from the first end. End 102 of the release button extends outwards from housing 72 and end 56 of the camera mount 46. End 104 of the release button 100 is positioned within the housing 72 and abuts end 90 of the latch 86 when the latch is in its locking mode shown in FIGS. 4, 8 and 10 and release mode shown in FIG. 11. The release button is slidably connected to the camera mount 46 in a manner that allows movement primarily along one longitudinal axis 106 as seen in FIG. 9. The release button 100 includes an oval-shaped slot 108 positioned between ends 102 and 104. The slot has a first end 110 adjacent to end 56 of the camera mount 46 and a second end 112 spaced-apart from ends 56 and 110. The camera mount 46 has a knob 114 that is cylindrical in this example and which extends through slot 108.

The release button 100 has a non-actuated mode shown in FIGS. 4 and 8 to 10 in which end 102 of the release button extends outwards from the camera mount 46 and in which knob 114 abuts end 112 of slot 108. The release button is moveable from the non-actuated mode to an actuated mode shown in FIG. 11, in which end 102 of the release button is pushed inwards relative to the camera mount 46 towards end 56 of the camera mount and in which knob 114 abuts end 110 of slot 108. In the actuated mode, end 104 of the release button biases end 90 of the latch 86 towards end 58 of the camera mount 46. This causes the latch to move towards its release mode shown in FIG. 11. When the user ceases to push on the release button, spring 92 biases end 88 of the latch 86 towards slot 82, which causes end 90 to exert a force against end 104 of the release button and bias the release button to return to its non-actuated mode shown in FIGS. 4 and 8 to 10.

As seen in FIGS. 5 and 7, the system 30 includes a first adapter, in this example a tripod mount adapter 116. The tripod mount adapter includes a base 118 that is connectable to an object, in this example tripod 34. The base is substantially rectangular and plate-like in shape in this example. The base of the adapter 116 has a front 120 seen in FIG. 5, a back 122 seen in FIG. 7 and which is opposite the front, a pair of spaced-apart sides 124 and 126 and a pair of spaced-apart ends 128 and 130 that are perpendicular to the sides. Front 120 and back 122 extend between sides 124 and 126, and ends 128 and 130. The adapter 116 includes a threaded aperture 132 that extends through the base 118 from front 120 through to back 122 of the base. The threaded aperture is positioned adjacent to end 128 and between sides 124 and 126. A threaded member, in this screw 129, the end of which is seen in FIG. 5, may threadably connect with and extend through a threaded aperture (not shown) of the tripod 34 and then aperture 132 of adapter 116 to connect the base 118 of the adapter 116 to the tripod. The base of the adapter may thus be said to include a means for connecting to a tripod. Alternatively, sides 124 and 126 and/or ends 128 and 130 may be configured to slide within a corresponding slot of the tripod 34, as is well known to those skilled in the art.

The tripod mount adapter 116 includes a protrusion 134 that operatively connects to and extends outwards from the base 118 of the adapter. The protrusion 134 in this example includes a first plate 136, best seen in FIG. 6, which abuts and connects to the front 120 of the base 118 of the adapter 116 at a location adjacent to end 130 of the base of the adapter. The first plate is positioned between sides 124 and 126 of the base of the adapter in this example. The first plate 136 is shaped to fit within slot 80 of the u-shaped recessed portion 78 of the camera mount 46 seen in FIG. 8.

The protrusion 134 in this example includes a second plate 138, best seen in FIG. 7, connected to and extending outwards from the first plate 136. Each of the plates 136 and 138 is substantially rectangular in this example. The second plate 138 is spaced-apart from the front 120 of the base 118 of the adapter 116. The second plate is larger than the first plate 136 as seen in FIG. 6. Plate 138 has a cut-out recessed portion 139, as best seen in FIG. 6, that is rectangular in this example and within which plate 136 sits. The second plate 138 is shaped to fit within slot 82 of the u-shaped recessed portion 78 of the camera mount 46 seen in FIG. 8. The second plate 138 has a pair of spaced-apart sides 140 and 142 which align with sides 124 and 126, respectively, of the base 118 of the adapter 116 in this example. The second plate has a pair of spaced-apart ends 144 and 146 which are perpendicular to its sides. End 146 of plate 138 aligns flush with and parallel to end 130 of the base 118 of the adapter 116 in this example. The second plate 138 includes a v-shaped notch 148 that extends inwards from its side 140. The second plate includes a pair of bevelled corners 150 and 152 positioned between side 140 and end 144, and side 142 and end 144, respectively. Lock washers (not shown) may be connected to screw 60 to inhibit the screw from losing and thus improving the security of the adapter.

The protrusion 134 includes a centrally disposed threaded aperture 154 that extends through the plates 136 and 138. The plates are threadably connected to the base 118 of the adapter 116 in this example via a threaded connector, in this example a screw 156, seen in FIG. 7, which extends from the back 122 of the base 118, through the front 120 of the base seen in FIG. 5 and threadably engages with aperture 154.

The protrusion 134 is shaped to fit within the u-shaped recessed portion 78 of the camera mount 46 shown in FIG. 1 and engage with the quick-release locking mechanism 76 for selectively connecting the adapter 116 to the camera mount. In operation and referring to FIG. 8, the adapter is positioned such that protrusion 134 aligns with and is moved towards u-shaped recessed portion 78, as shown by the arrow 158. The latch 86 is shown in the locking mode in FIG. 8.

Referring now to FIG. 9, as the plates of the protrusion 134, as shown by plate 138, enter within the u-shaped recessed portion 78 of the camera mount 46, plate 138, and in particular, beveled corner 150 of the plate, abuts the first end 88 of the latch 86. This causes the latch 86 to rotate away from recessed portion 78 and towards its release mode. In this example the latch pivots in a clockwise direction. The base 118 of the adapter 116, seen in FIG. 5, is not shown in FIGS. 9 to 11 for the sake of clarity.

Figure 10:
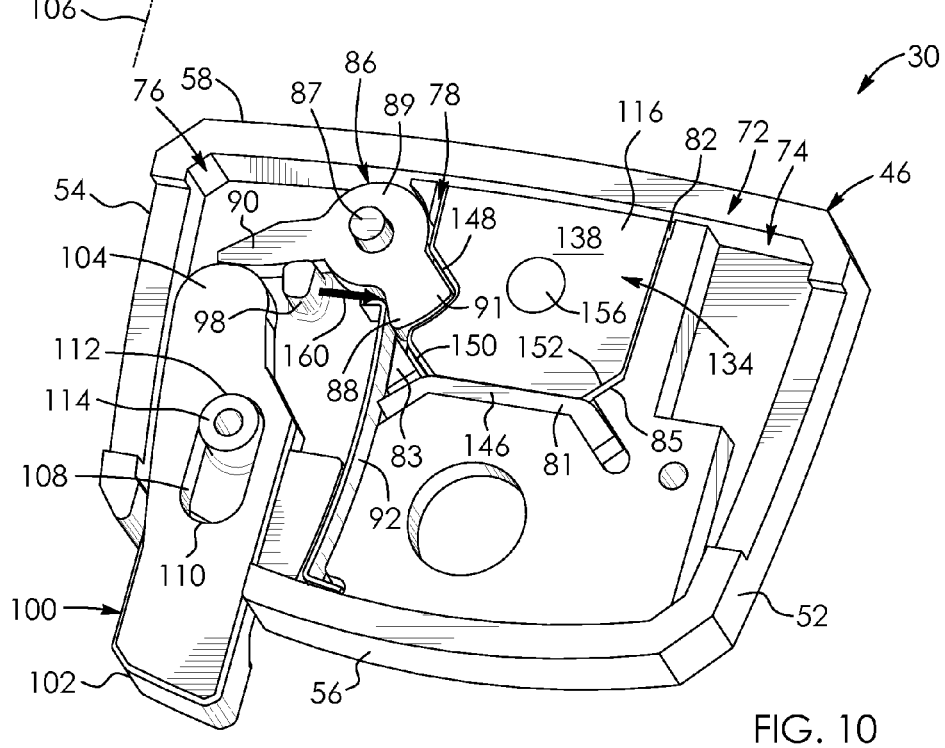
FIG. 10 is a top perspective view of the camera mount of FIG. 9 together with the protrusion of the tripod mount adapter fitted within the u-shaped recessed portion of the camera mount, the latch being shown in a locking mode.
Figure 12:
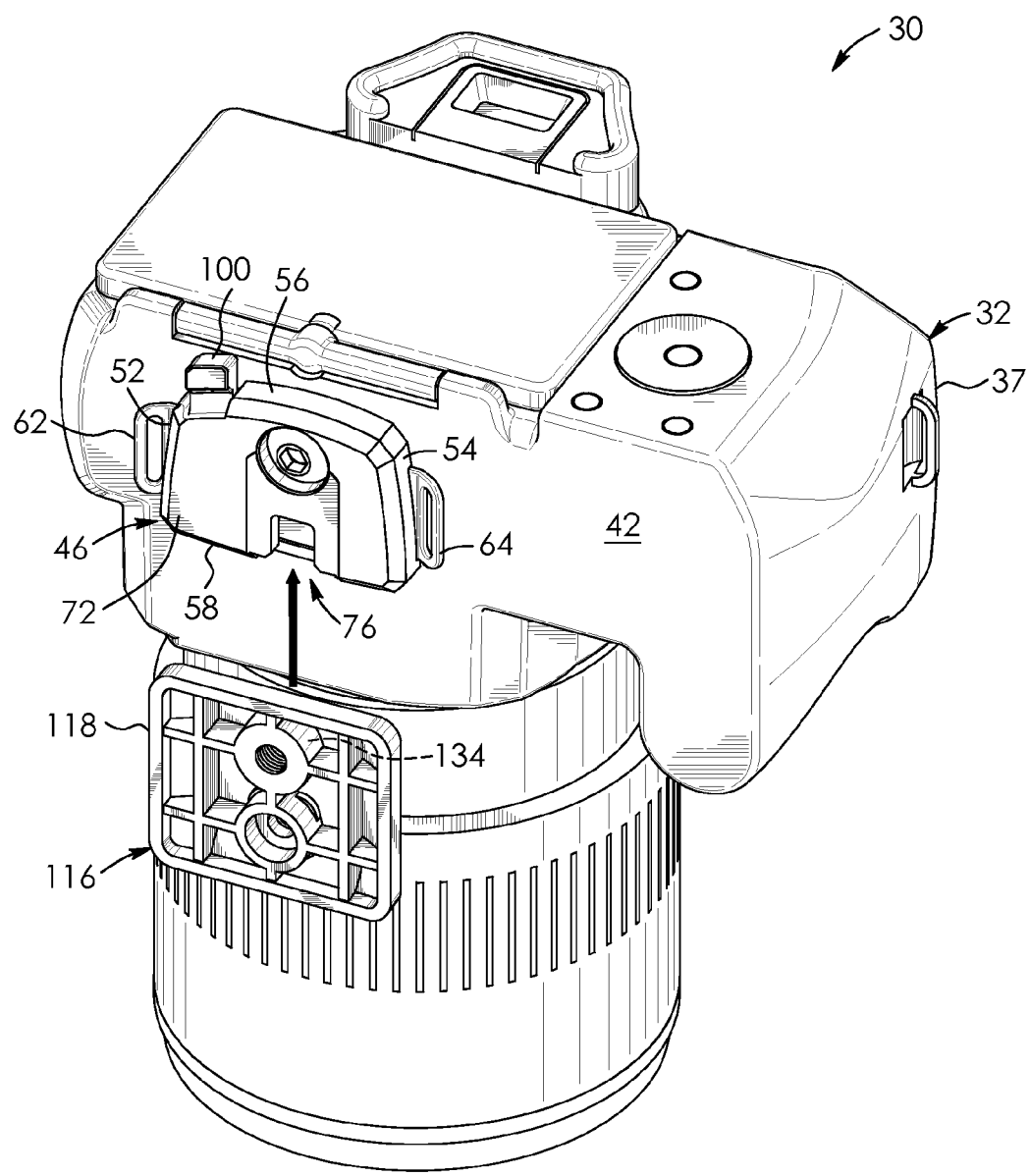
FIG. 12 is a rear, bottom perspective view of the camera of FIG. 1, with the camera mount connected thereto, and the tripod mount adapter of FIG. 5 in the process of being connected to the camera mount.
Figure 13:
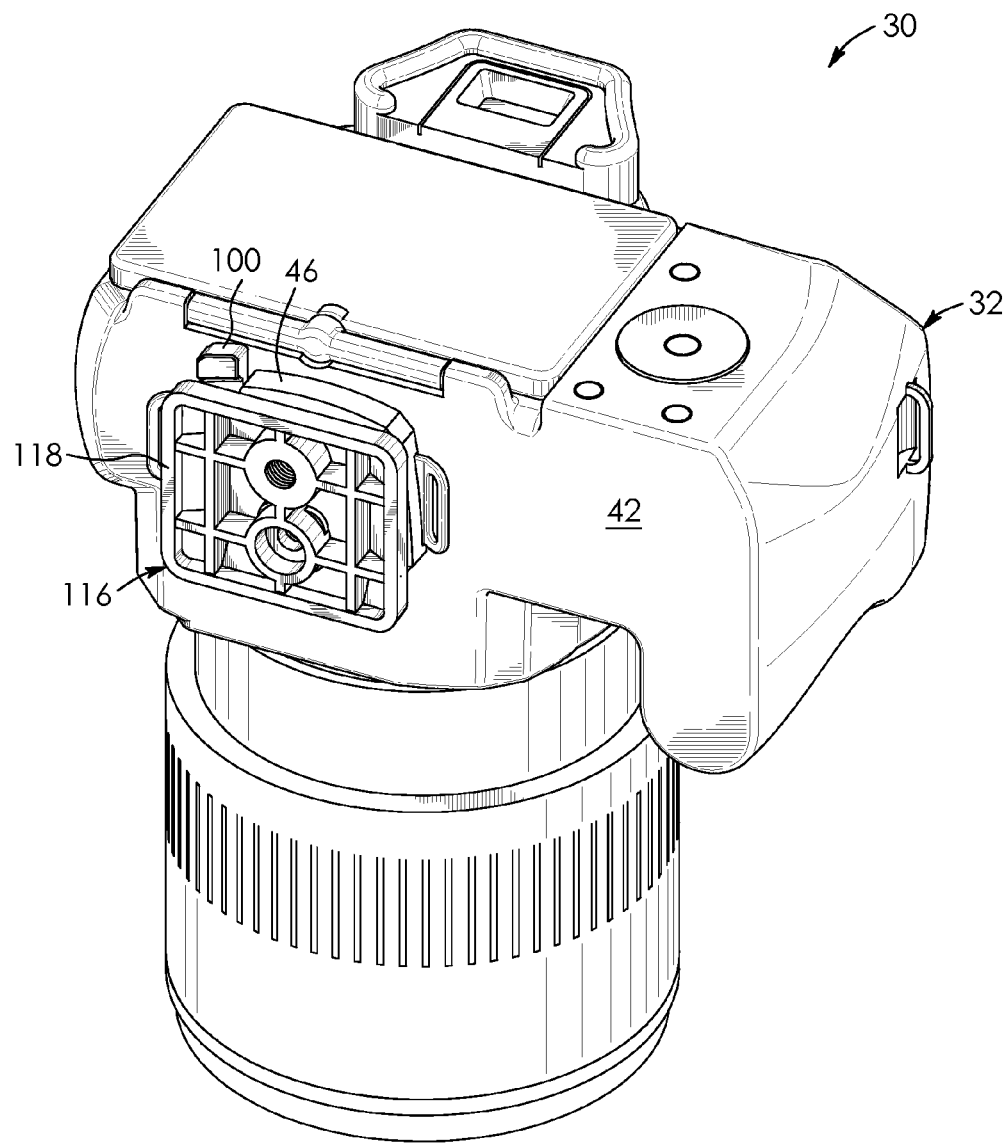
FIG. 13 is a rear, bottom perspective view of the camera of FIG. 12, with the camera mount connected thereto and the tripod mount adapter connected to the camera mount.

As seen in FIG. 10, the protrusion 134 is inserted further within u-shaped recessed portion 78 until end 146 and bevelled corners 150 and 152 of plate 138 abut dampener 81, and wedge-shaped ends 83 and 85, respectively, of the camera mount 46. At this stage, v-shaped notch 148 and spring 92 cause latch 86 to pivot back in a counter clockwise direction, as shown by arrow 160. In this manner, end 88 of the latch moves towards the v-shaped notch, with wedge-shaped portion 91 abutting with and engaging with the notch. Thus, in the locking mode seen in FIG. 10, the latch 86 engages with the protrusion 134 of the adapter 116. In this manner and as seen in FIGS. 12 and 13, the camera mount 46 and thus the camera 32, may readily connect to the adapter 116, which may be already connected to the tripod 34 as seen in FIG. 5.

Figure 11:
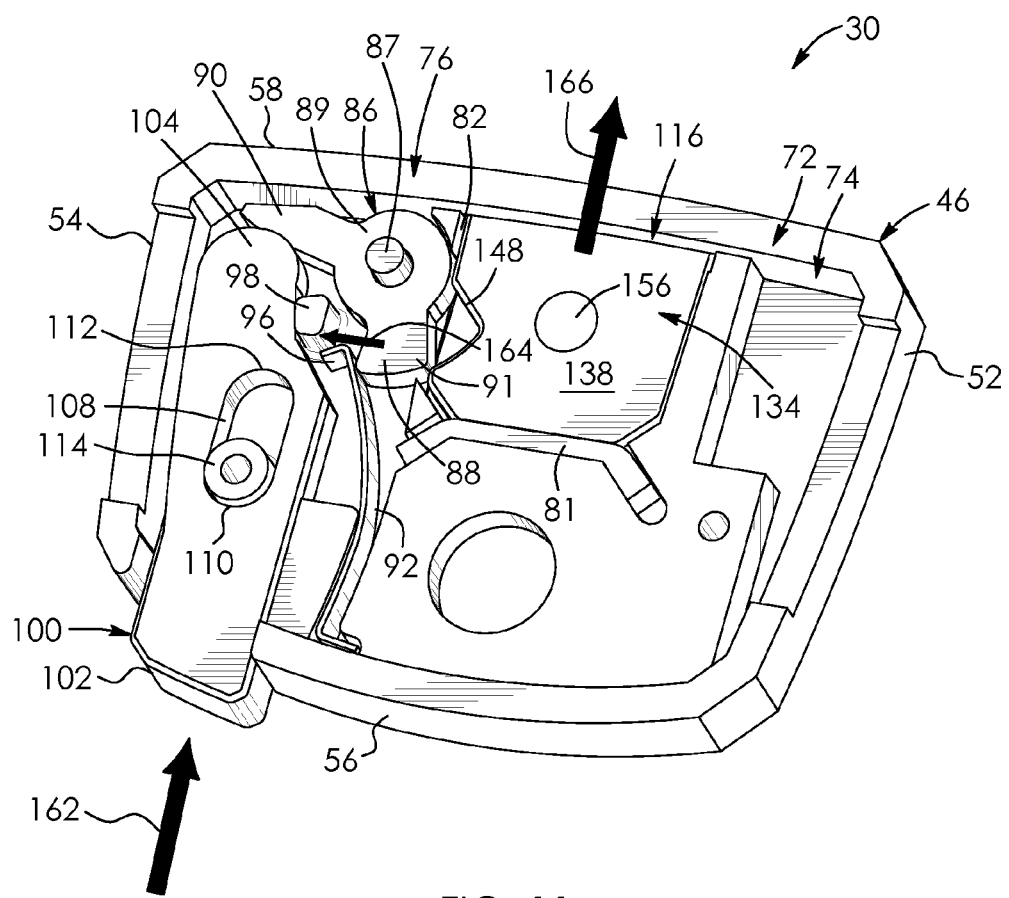
FIG. 11 is a top perspective view of the camera mount of FIG. 10 together with the protrusion of the tripod mount adapter fitted within the u-shaped recessed portion of the camera mount, the camera mount includes a release button actuating the latch, the latch being shown in a release mode.

As seen in FIG. 11, to release the camera from the adapter 116, end 102 of the release button 100 is pressed inwards towards the interior 74 of the camera mount, as seen by the arrow 162. This causes end 104 of button 100 to abut end 90 of the latch 86, causing the latch to move in a clockwise direction, as shown by the arrow 164. This causes the wedge-shaped portion 91 of the latch to move outwards and away from the v-shaped notch 148, u-shaped recessed portion 78 and plate 138. The latch so removed enables protrusion 134 to be removed and released from the camera mount 46, as shown by the arrow 166. The release button 100 thus selectively engages the second end 90 of the latch 86, thereby moving the latch from the locking mode of FIG. 10 to the release mode seen in FIG. 11.

Figure 14:
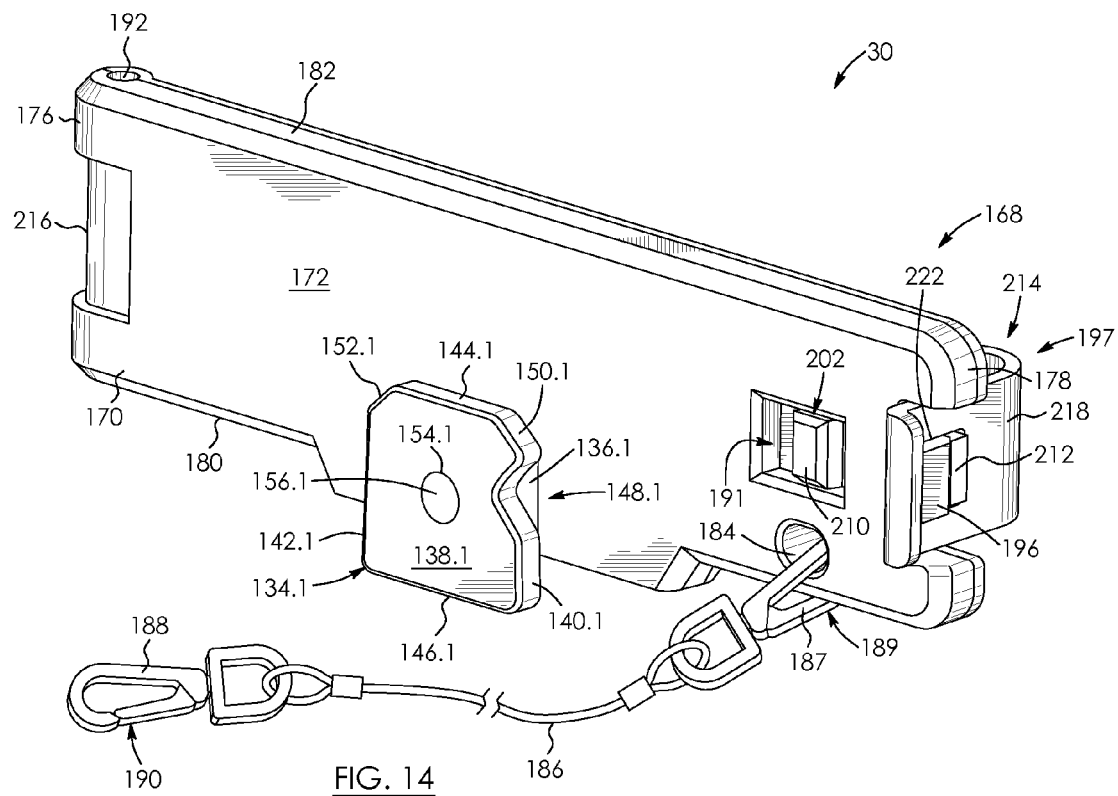
FIG. 14 is a front perspective view of a strap mount adapter, the adapter having a base and an elongate arm connected to the base in a closed position.
Figure 15:
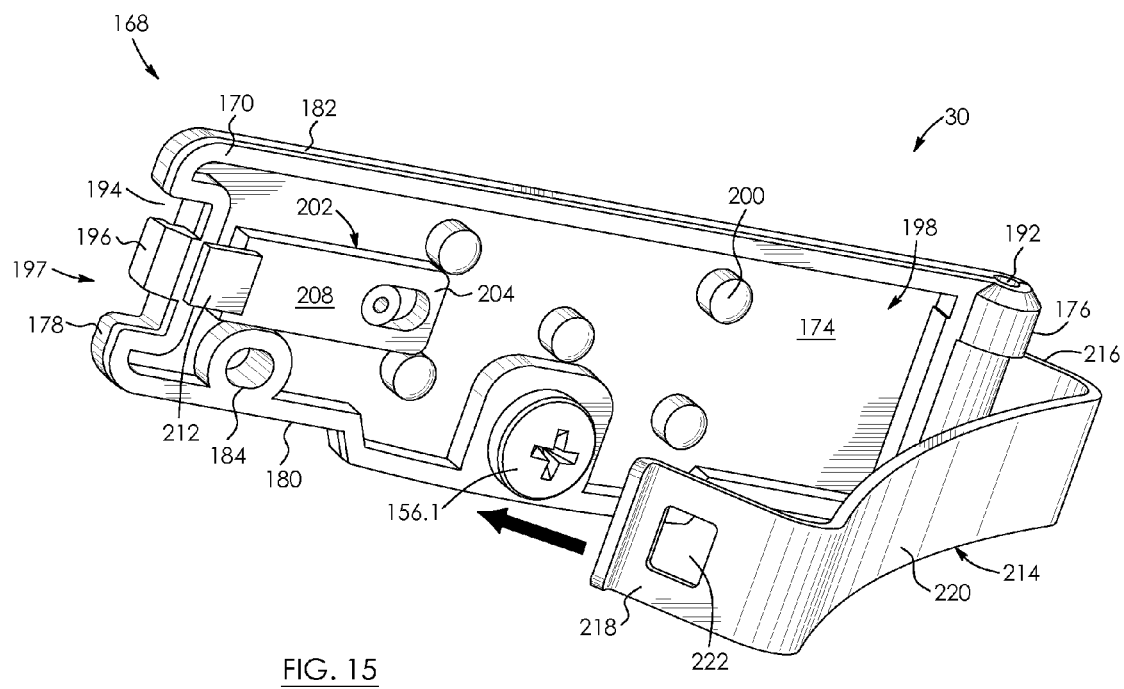
FIG. 15 is a rear perspective view of the strap mount adapter of FIG. 14, the with the elongate arm being shown in an open position.

As seen in FIGS. 14 to 20, the system 30 includes a second adapter, in this example a strap mount adapter 168. The adapter has a base 170. Referring to FIGS. 14 and 15, the base includes a front 172, a back 174 opposite the front, a pair of spaced-apart sides 176 and 178 and a pair of spaced-apart ends 180 and 182 that are perpendicular to its sides in this example. Front 172 and back 174 extend between sides 176 and 178 and ends 180 and 182. Base 170 is generally in the shape of a rectangular plate, its ends being longer than its sides.

Adapter 168 includes a protrusion 134.1. The protrusion is substantially similar in parts and function to protrusion 134 of the adapter 116 shown in FIGS. 5, 6 and 8 to 11. Thus, like parts of protrusion 134.1 have like numbers and functions as protrusion 134 of adapter 116 shown in FIGS. 5, 6 and 8 to 11 with the addition of "0.1". Protrusion 134.1 of adapter 168 therefore engages with and releases from the camera mount 46 in a substantially similar manner as described above and therefore will not be again described. The quick-release locking mechanism 76, together with protrusions 134 and 134.1 of adapters 116 and 168, respectively, may be referred to as a quick-release locking means for connecting respective ones of the adapters 116 and 168 to the camera mount 46.

End 146.1 of plate 138.1 generally aligns with end 180 of the base 170 of the adapter 168. Protrusion 134.1 is positioned between sides 176 and 178 of the base of the adapter in this example. As seen in FIG. 15, screw 156.1 is substantially similar to screw 156 shown in FIG. 7, and threadably extends through back 174 of the base, through front 172 of the base seen in FIG. 14 for threadably connecting protrusion 134.1 to the front 172 of the base of the adapter 168.

The base 170 of the adapter includes a side aperture 184 extending therethrough and which is positioned adjacent to side 178. The system 30 may include an additional safety tether 186 with a first end 187, a second end 188 spaced-apart from the first end, and a pair of hook members, in this example snap hooks 189 and 190 connected to ends 187 and 188, respectively. Snap hook 189 connects to and extends from aperture 184 and snap hook 190 connects to the user (not shown). In this manner, safety tether 186 functions to further inhibit camera 32, seen in FIG. 1, from falling to the ground and getting damaged should one lose grip of the camera.

Figures 17, 18:
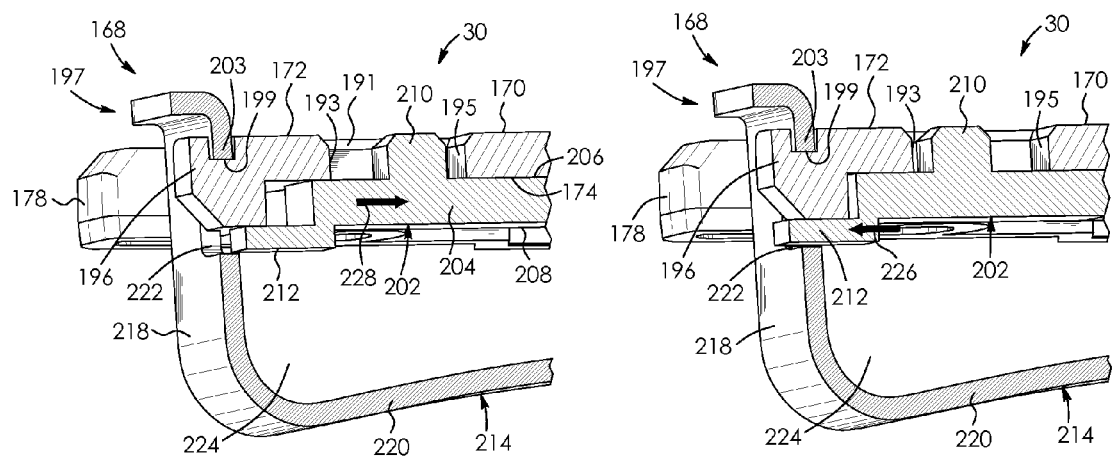
FIG. 17 is a longitudinal, fragmented view of the strap mount adapter shown in section, the elongate arm connecting to the base of the adapter and the adapter including a locking arm in an unlocked position.
FIG. 18 is a longitudinal, fragmented sectional view of the strap mount adapter, the elongate arm connecting to the base of the adapter and the locking arm shown in a locked position.

The base 170 includes an actuation aperture 191, seen in FIG. 14, positioned adjacent to its side 178 and aperture 184. Aperture 191 is rectangular in this example and extends from front 172 of the base through to the back 174 of the base, as seen in FIG. 17. The base 170 includes a pair of spaced-apart inner walls 193 and 195 that face the aperture. Referring to FIG. 15, side 176 of base 170 includes a pivot connection, in this example a hinge 192.

The adapter 168 includes a locking mechanism 197. The locking mechanism may be referred to as a means for connecting to at least one of the backpack strap or the belt for adapter 168. The locking mechanism 197 includes a recessed portion 194 at side 178 of its base and a centrally disposed tab 196 located within the recessed portion 194. Referring back to FIGS. 17 and 18, inner wall 193 is spaced-apart from and adjacent to tab 196. The locking mechanism 197 includes a groove 199 extending inwards from front 172 of its base 170.

As seen in FIG. 15, the base 170 of the adapter 168 includes an interior recessed portion 198 located by back 174. The base includes a plurality of spaced-apart spikes, as shown by spike 200, which extend outwards from back 174.

The locking mechanism 197 includes a locking arm 202 slidably connected to the base 170 of the adapter. Referring to FIG. 17, the locking arm has an elongate base 204 with a first side 206 that abuts back 174 of base 170 of the adapter 168 and a second side 208 that is opposite from the first side 206. The locking arm 202 includes an actuation tab 210 that extends outwards from side 206 and extends through actuation aperture 191. The locking arm includes a protruding end 212 that connects to side 208 and extends outwards from base 204.

The locking arm 202 has an unlocked position shown in FIGS. 15 and 17 and, as best seen in FIG. 17, in which tab 210 is positioned towards and adjacent to inner wall 195 of the base 170 of adapter 168 and in which protruding end 212 of the arm is positioned adjacent to and in parallel with tab 196 of base 170. The locking arm has a locked position shown in FIGS. 14, 16 and 18 and as best seen in FIG. 18, in which tab 210 is positioned towards and adjacent to inner wall 193 of the base of the adapter and in which protruding end 212 of the arm is inwardly spaced-apart from tab 196.

As seen in FIG. 15, adapter 168 includes an elongate arm 214. The elongate arm has a generally elongate, u-shape in this example. The arm 214 has a first end 216 that pivotally connects to the base 170 of the adapter 168 via hinge 192. The arm has a second end 218 spaced-apart from the first end of the elongate arm. Each of the ends 216 and 218 is partially, concavely bent in an arc that is L-shaped. Arm 214 includes a resilient central portion 220 that extends between ends 216 and 218. The whole of the arm, including its ends, is made of a flexible material that enables it to be resilient in this example. The second end 218 of the arm 214 is a part of the locking mechanism 197 and it includes a locking aperture 222 that is in the shape of a rectangular prism in this example.

Arm 214 has an open position, seen in FIG. 15, in which base 170 of adapter 168 and the arm can be positioned about strap 36 seen in FIG. 16. The arm has a closed position, seen in FIGS. 14 and 16 to 20, in which the second end 218 of the arm engages with the locking mechanism 197 of the adapter 168 for holding the strap in place and thus operatively connecting the camera thereto. In the closed position so shown, base 170 and arm 214 secure the strap 36 therebetween, as seen in FIG. 16. Spikes 200, seen in FIG. 15, may further promote a connection between adapter 168 and the strap. In the closed position, adapter 168 forms an elongate aperture 224, seen in FIG. 16, between base 170 and arm 214. The aperture is shaped for strap 36 to extend therethrough.

The functioning of the locking mechanism of the adapter will now be described in more detail. In this example and referring to FIG. 17, end 218 of arm 214 resiliently conforms so as to fit around tab 196, with the tab extending through aperture 222. Tab 196 is thus shaped to fit through the locking aperture 222. The tab engages the locking aperture for snapping the elongate arm 214 together with the base 170 of the adapter 168, holding the strap 36 in place as seen in FIG. 16. Portions 203 of end 218 of arm 214 engage groove 199, as seen in FIGS. 17 and 18. Actuation tab 210 of locking arm 202 may then be moved towards the locked positioned, as shown by the arrow 226, which causes protruding end 212 to further extend within aperture 222 for further locking in place arm 214 to base 170 of adapter 168 when the arm is in the closed position.

Figure 19:
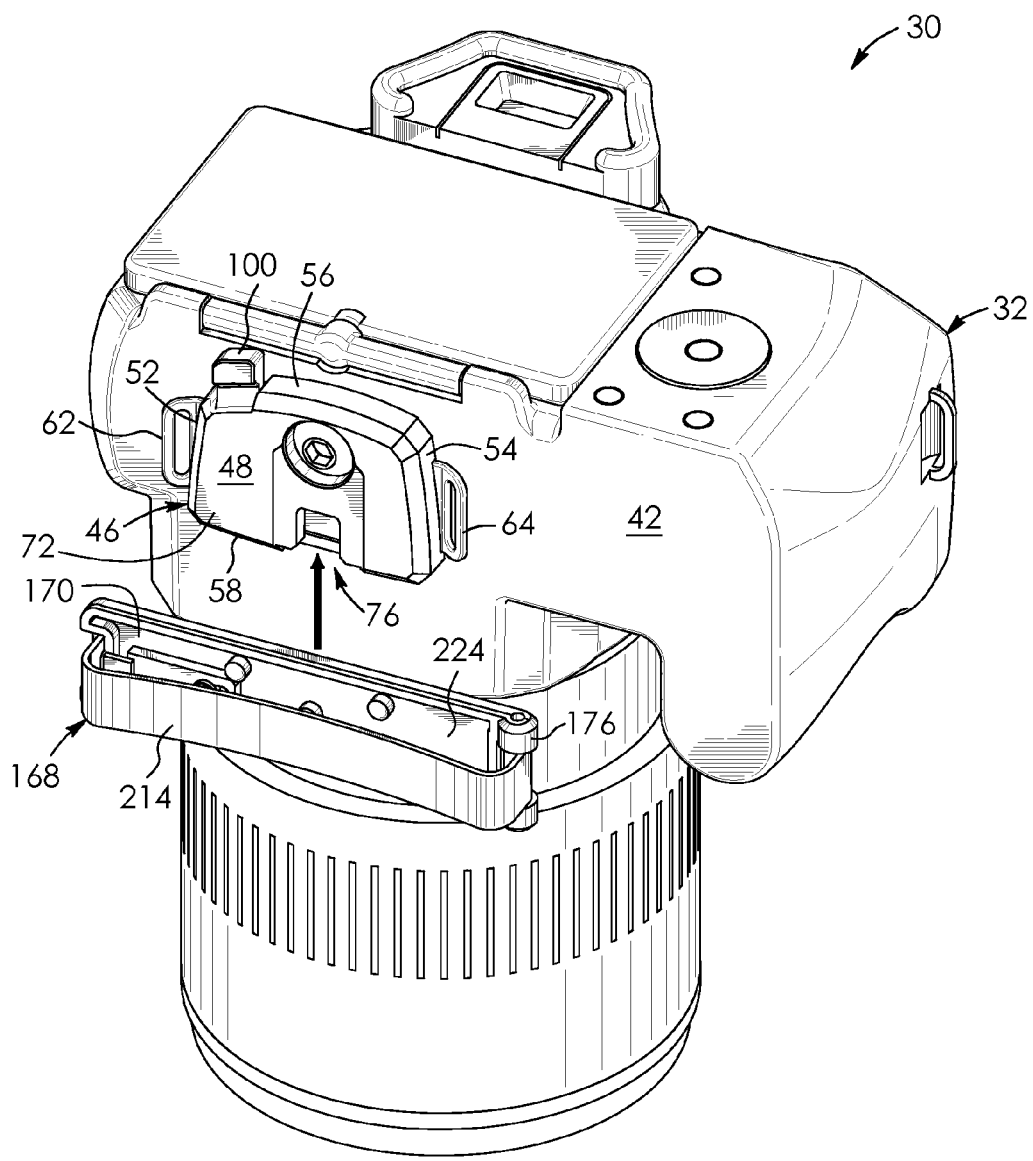
FIG. 19 is an exploded, rear, bottom perspective view of the camera of FIG. 1, with the camera mount connected thereto, and the strap mount adapter of FIG. 16 in the process of being connected to the camera mount.
Figure 20:
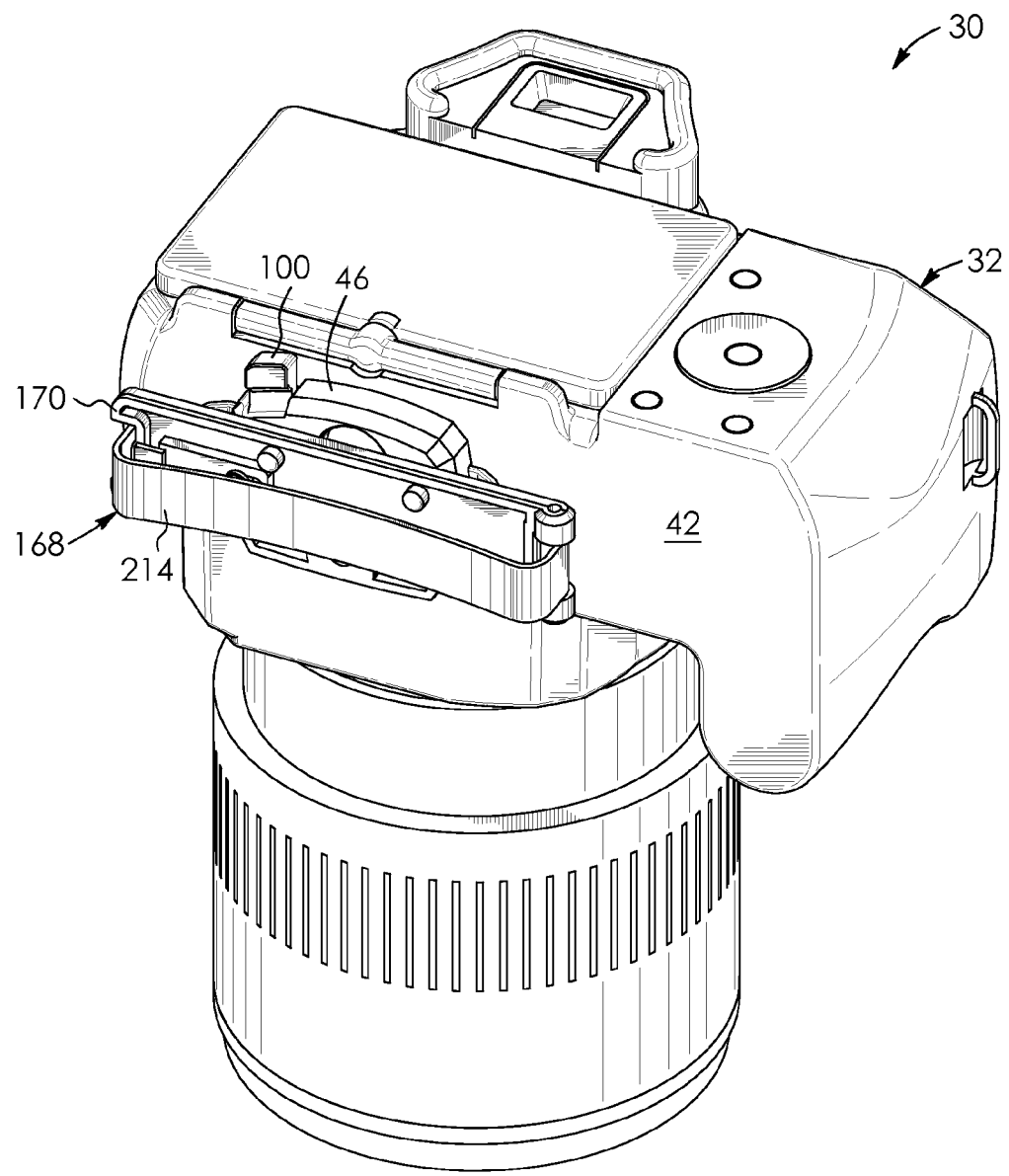
FIG. 20 is a rear, bottom perspective view of the camera of FIG. 19, with the camera mount connected thereto and the strap mount adapter connected to the camera mount.

Adapter 168 readily connects to camera mount 46 seen in FIG. 19, in a substantially like manner as previous described, thus enabling the camera to readily connect to the strap.

To release the strap 36 seen in FIG. 16, actuation tab 210 is moved into the unlocked position, as shown by FIG. 17 and the arrow 228. The locking arm 202 remains out of the locking aperture 222 in the unlocked position. End 218 of arm 202 may then be extended outwards and away from base 170 of adapter 168 for unhooking end 218 of the arm from tab 196. Arm 202 may then be swung to the open position shown in FIG. 15 for removing the strap 36.

The quick-release camera mounting system, together with the adapters 116 and 168, and/or hand strap 66 and safety tether 70 shown in FIG. 2, and/or additional safety tether 186 shown in FIG. 14, may be sold together as a kit.

It will be appreciated that many variations are possible within the scope of the invention described herein. For example, referring to FIG. 17, locking aperture 222 may be located on the base 170 of adapter 168 and tab 196 may extend from end 178 of arm 214.

As mentioned above, instead of connecting to a backpack strap, belt or tripod, alternatively the system may include adapters shaped to connect with a variety of other objects, including, for example, handlebar mounts for bikes and car dashboard mounts.

It will also be understood by someone skilled in the art that many of the details provided above are by way of example only and are not intended to limit the scope of the invention which is to be determined with reference to at least the following claims.

What is claimed is:

1. A quick-release camera mounting system for connecting a camera to an object, the camera having a base, the system comprising:
    an adapter having a base that is connectable to the object and having a protrusion that operatively connects to and extends outwards from the base of the adapter,
    a camera mount threadably connecting to the base of the camera and for connecting with the adapter, the camera mount having a locking mechanism capable of quickly releasing the adapter from the camera mount, the locking mechanism including a centrally disposed recessed portion, the protrusion being shaped to fit within the recessed portion and engage with the locking mechanism for selectively connecting the adapter to the camera mount.

2. The system as claimed in claim 1 wherein the camera mount has a housing and wherein the locking mechanism is substantially disposed within the housing of the camera mount.

3. The system as claimed in claim 1 wherein the locking mechanism includes a latch having a wedge-shaped portion and wherein the protrusion of the adapter has a corresponding v-shaped notch within which the wedge-shaped portion of the latch abuts for selectively connecting the adapter to the camera mount.

4. The system as claimed in claim 1 wherein the locking mechanism includes a latch disposed within the camera mount, the latch pivotally connected to the camera mount, the latch having a first end and a second end spaced-apart from the first end, the latch having a spring-biased locking mode in which at least a portion of the first end of the latch extends within the recessed portion of the camera mount for engaging with the protrusion of the adapter, and the latch having a release mode in which the first end of the latch is positioned substantially free of the recessed portion of the camera mount, actuation of the second end of the latch disposing the latch towards the release mode.

5. The system as claimed in claim 4 further including a release button that selectively engages the second end of the latch, thereby moving the latch from the locking mode to the release mode.

6. The system as claimed in claim 1 wherein the protrusion of the adapter comprising a first plate and a second plate connected to and adjacent to the first plate, the second plate being spaced-apart from the base of the adapter, the second plate being larger than the first plate, wherein the recessed portion includes a first slot shaped to receive the first plate of the adapter and a second slot shaped to receive the second plate of the adapter, wherein the locking mechanism includes a latch having a wedge-shaped portion, and wherein the second plate of the adapter has a corresponding v-shaped notch within which the wedge-shaped portion of the latch abuts for selectively connecting the adapter to the camera mount.

7. The system as claimed in claim 1, the camera having a threaded aperture at its base, wherein the camera mount further includes a threaded connector, the threaded connector engaging with the threaded aperture of the base of the camera for connecting the camera mount to the camera, and wherein the protrusion of the adapter is substantially rectangular.

8. The system as claimed in claim 1 wherein the camera mount further includes a strap connector and wherein the system further includes a hand strap having a first end and a second end spaced-apart from the first end, the first end of the hand strap connecting to the strap connector of the camera mount and the second end of the hand strap connecting to the strap connector of the camera.

9. The system as claimed in claim 1 wherein the camera mount has a pair of spaced-apart strap connectors extending outwards therefrom for connecting to one or more safety straps.

10. The system as claimed in claim 9, the camera having a strap connector, the system including a hand strap having a first end and a second end spaced-apart from the first end, the first end of the hand strap connecting to a first one of the strap connectors of the camera mount and the second end of the hand strap connecting to the strap connector of the camera, and the system further including a safety tether connecting to a second one of the strap connectors of the camera mounts.

11. The system as claimed in claim 9 wherein the camera mount has a pair of opposite sides and a top extending between the sides, the top of the camera mount abutting the base of the camera and the strap connectors connecting to and extending outwards from respective ones of the sides of the camera mount.

12. The system as claimed in claim 1 wherein the base of the adapter includes a means for connecting to a tripod.

13. The system as claimed in claim 1 wherein the base of the adapter is substantially rectangular and plate-like in shape and includes a threaded aperture extending therethrough, the base of the adapter so configured being shaped to connect with a tripod.

14. The system as claimed in claim 1 wherein the adapter has an elongate aperture shaped for receiving a backpack strap or a belt.

15. The system as claimed in claim 1, wherein the adapter has an elongate arm having a first end that pivotally connects to the base of the adapter and a second end spaced-apart from the first end of the elongate arm, and wherein the adapter has a locking mechanism, the elongate arm having an open position in which the base and the elongate arm of the adapter are positionable around a backpack strap or a belt and a closed position in which the second end of the elongate arm engages with the locking mechanism of the adapter for holding the backpack strap or the belt in place and thus operatively connecting the camera thereto.

16. The system as claimed in claim 1, wherein the adapter has an elongate arm having a first end that pivotally connects to the base of the adapter and a second end spaced-apart from the first end of the elongate arm, the elongate arm having an open position in which the base and the elongate arm of the adapter are positionable around a backpack strap or a belt, wherein a first one of the elongate arm and the base has a locking aperture and a second one of the elongate arm and the base has a tab shaped to fit through the locking aperture, the elongate arm having a closed position in which the tab engages the locking aperture for snapping the elongate arm together with the base of the adapter, holding the backpack strap or the belt in place and thus operatively connecting the camera thereto.

17. The system as claimed in claim 16, wherein the adapter further includes a locking arm slidably connected to the base of the adapter, the locking arm having an unlocked position in which, when the elongate arm is in the closed position, the locking arm remains substantially free of the locking aperture, and a locked position in which, when the elongate arm is in the closed position, at least a portion of the locking arm extends at least partially through the locking aperture for further locking in place the elongate arm to the base of the adapter when in the closed position.

18. The system as claimed in claim 1 wherein the recessed portion is u-shaped.

19. A quick-release camera mounting system for mounting a camera to one of a plurality of objects, including a tripod, a backpack strap or a belt, the system comprising:
   a camera mount having a means for connecting to the camera; and
   a pair of adapters, the adapters each having substantially similar protrusions, the camera mount having a quick-release locking means for selectively connecting to the protrusion of either of the respective ones of the adapters to the camera mount, a first one of the adapters having a means for connecting to the tripod and a second one of the adapters having a means for connecting to at least one of the backpack strap or the belt.

20. A quick-release camera mounting system for connecting a camera to one of a plurality of objects, including a tripod, a backpack strap or a belt, the camera having a base, the system comprising:
   a camera mount threadably connecting to the base of the camera, the camera mount having a locking mechanism which includes a u-shaped recessed portion; and
   a pair of adapters each having a base and a substantially similar protrusion that operatively connects to and extends outwards from the base, the protrusions being shaped to fit within the u-shaped recessed portion and engage with the locking mechanism for selectively connecting respective ones of the adapters to the camera mount, the locking mechanism being capable quickly releasing from respective ones of the adapters, a first one of the adapters having a means for connecting to the tripod, and a second one of the adapters having an elongate aperture shaped for the backpack strap or the belt to extend therethrough.

21. The system as claimed in claim 20, wherein the first one of the adapters is substantially rectangular and plate-like in shape and includes a centrally disposed threaded aperture for threadably connecting to the tripod, the base of the first one of the adapters being shaped to connect with the tripod, and wherein the second one of the adapters has an elongate arm with a first end that pivotally connects to the base of the second one of the adapters and a second end spaced-apart from the first end of the elongate arm, and the second one of the adapters further including a locking mechanism, the elongate arm having an open position in which the base and the elongate arm of the second one of the adapters are positionable around the backpack strap or the belt and the elongate arm having a closed position in which the second end of the elongate arm engages with the locking mechanism of the second one of the adapters for holding the backpack strap or the belt in place.

* * * * *